Dec. 4, 1934.  A. Z. MAMPLE  1,983,042
SPLICE FOR LEAD SHEATHED CABLES
Filed May 12, 1930  3 Sheets-Sheet 1
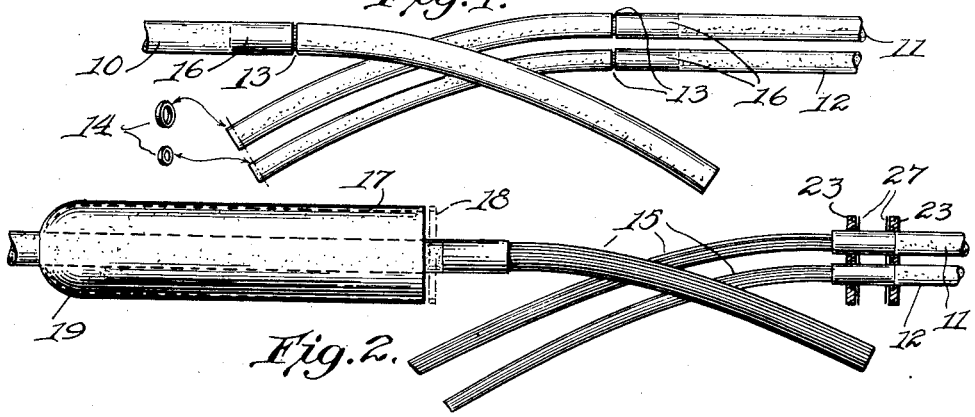
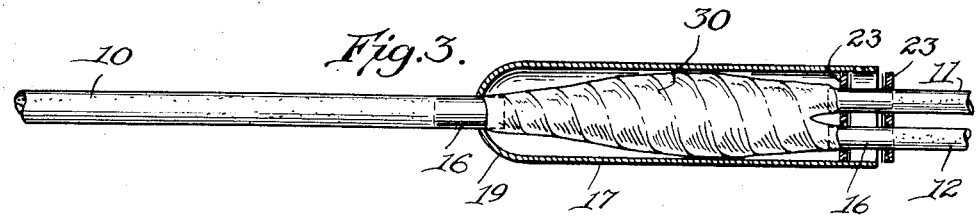
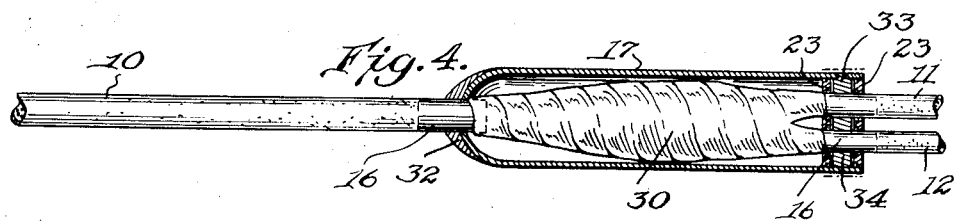
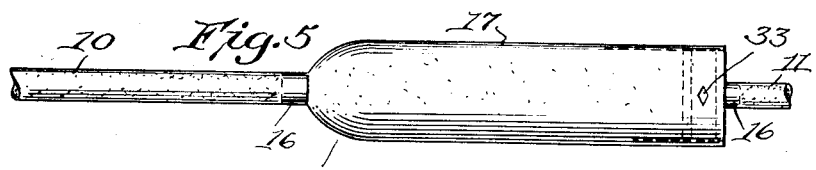
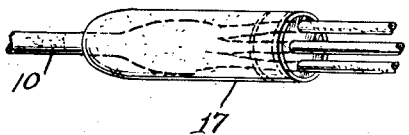
Inventor
A. Z. Mample
By
Eugene C. Brown
Attorney

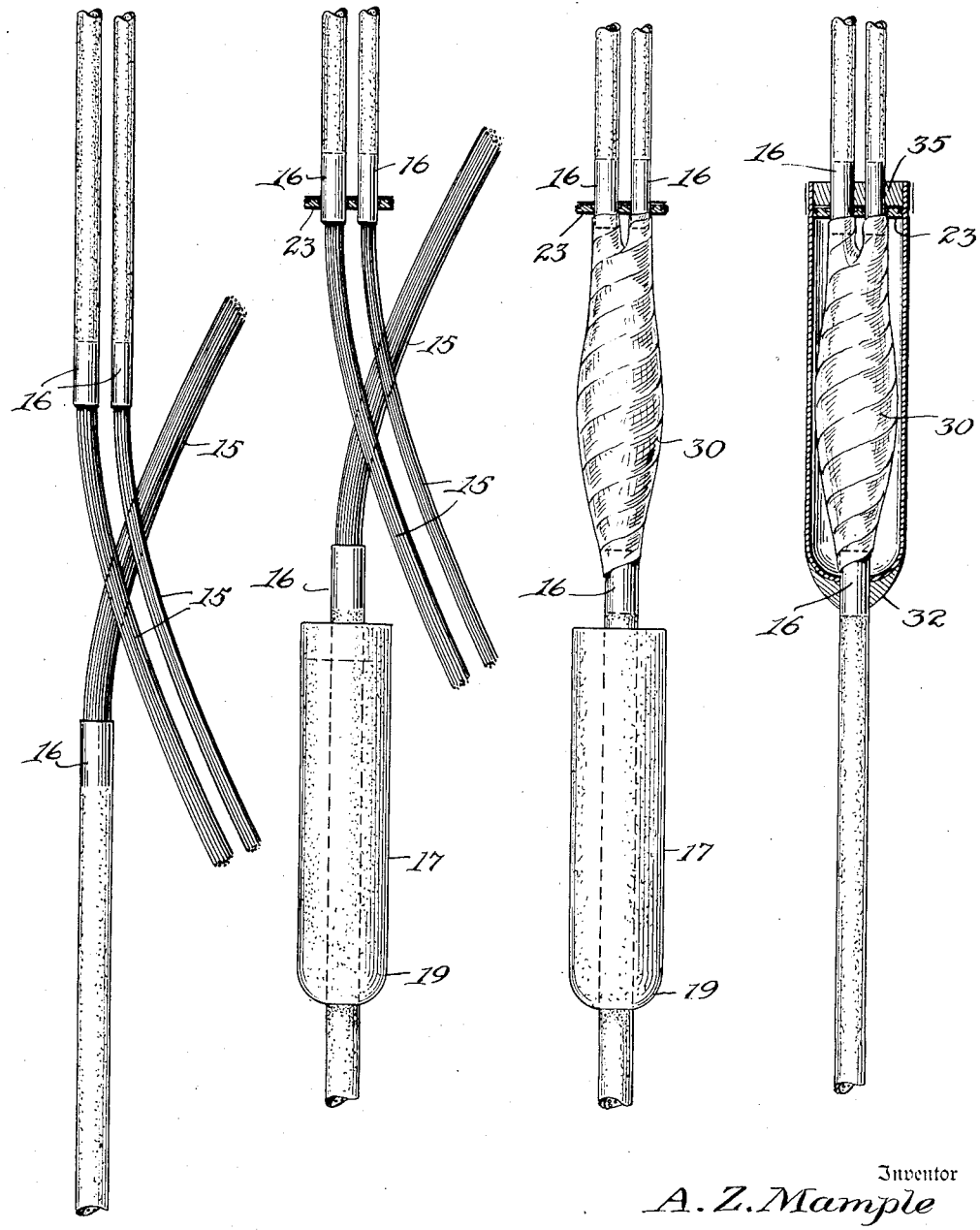

Dec. 4, 1934.  A. Z. MAMPLE  1,983,042
SPLICE FOR LEAD SHEATHED CABLES
Filed May 12, 1930  3 Sheets-Sheet 3
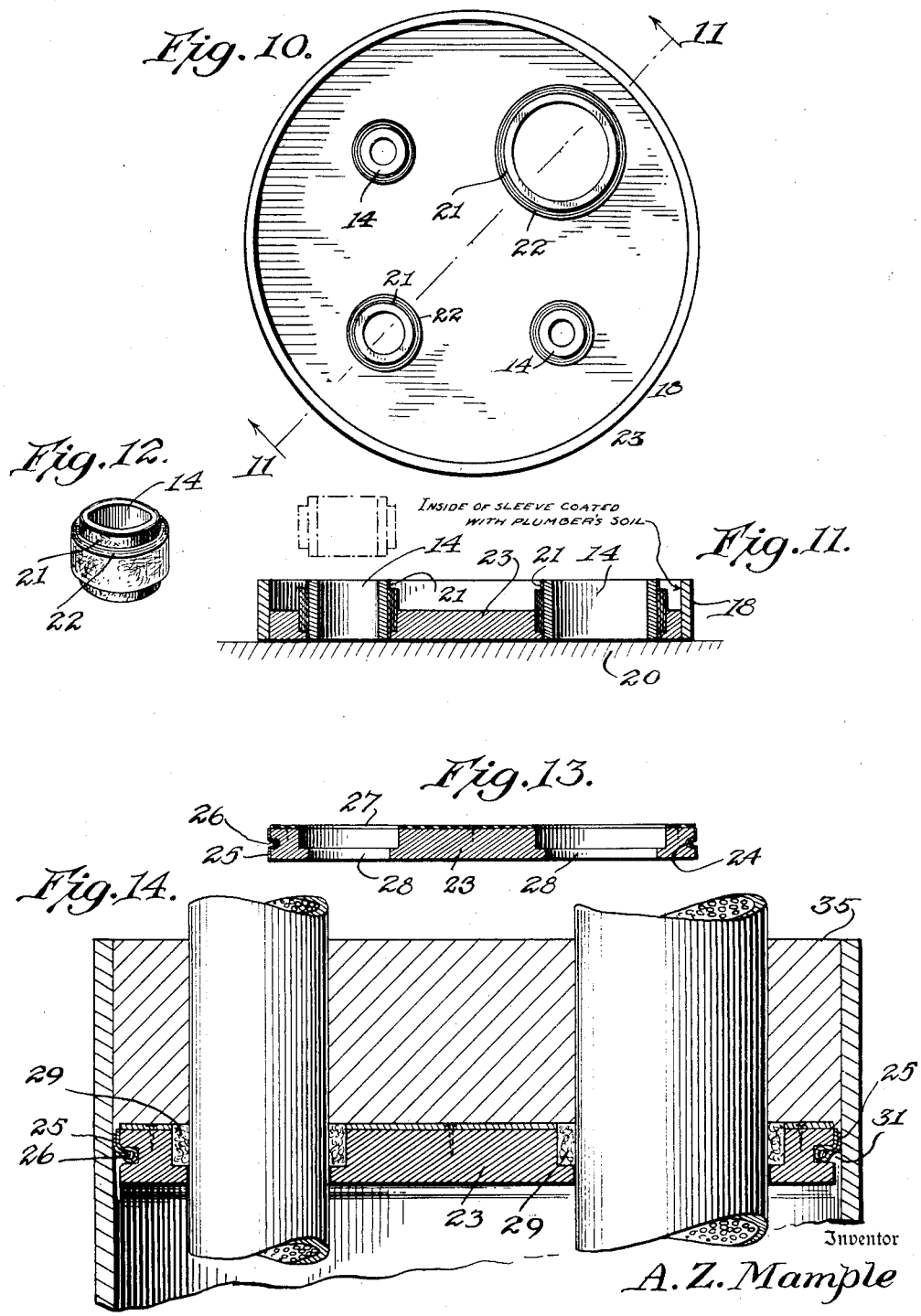
Inventor
A. Z. Mample
Eugene C. Brown
Attorney Patented Dec. 4, 1934

1,983,042

UNITED STATES PATENT OFFICE 1,983,042

SPLICE FOR LEAD SHEATHED CABLES

Adolph Z. Mample, Glen Rock, N. J., assignor to The Western Union Telegraph Company, New York, N. Y., a corporation of New York Application May 12, 1930, Serial No. 451,744

3 Claims. (Cl. 173—268)

This invention relates to cable splices and has special reference to splices and a method of making the same.

Splices between lead sheathed cables have heretofore been made by splicing the wires of two or more cables in the usual manner and wrapping the spliced conductors with treated muslin or similar insulating material. A lead sleeve is then slipped over the spliced conductors, which in the usual manner has been beaten in to cause it to conform as closely as possible to the sheathed parts of the cables, and the joint between the sleeve and cables sealed by means of a wiped joint similar to a joint used by plumbers in joining the ends of lead pipe. Where but a single cable enters an end of the sleeve the latter may be readily beaten in to lie in close contact with the cable, and the joint wiped in the usual manner, but where two or more cables enter the same end of the sleeve, it has been found practically impossible to beat in the sleeve so that it will contact around the cables and close the spaces between the cables, and to wipe the joint so as to make an effective seal between the cables and between the cables and sleeve. It has also been found difficult to maintain the plurality of cables in proper positions. By reason of these difficulties, the wiped joints of splices where more than two cables enter at one end, have been found to be so unreliable that it has become the standard practice of the larger communication companies in this country to prohibit more than two cables entering a sleeve at one end, where water or dampness is present, such as in manholes, cable vaults and unfinished basements.

Among the important objects of the present invention are to provide an improved form of splice wherein the interior of the sleeve may be sealed off from the atmosphere in a perfectly waterproof manner; to provide an improved form of joint wherein the plurality of cables entering an end of the sleeve may be maintained in desired spacial relation; to provide a simple and efficient separator for such a plurality of cables wherein forming cores are constructed from sections of the cable sheaths so that a proper fit is assured; to provide a supporting disk for such cables of the proper size to fit closely within the sleeve; to provide an improved method for forming said disk; and to provide an improved general method of assembling and constructing such a splice.

With the above and other objects in view certain forms of the invention will now be particularly described and specifically claimed, reference being had to the accompanying drawings wherein:—

Figure 1 is a side elevation, showing the first step in the preparation of a horizontal splice between lead sheathed cables.

Figure 2 is a view of the same cables with the sheaths of the cables removed and the sleeve and a pair of separator plates or disks in their temporary positions preparatory to splicing the cable conductors.

Figure 3 is a view, partly in section showing the splicing of the individual wires completed and the spliced wires wrapped, the sleeve being in its final position.

Figure 4 is a view, partly in section of the completed splice.

Figure 5 is a top plan view of the completed splice.

Figure 6 is a view of lead sheathed cables prepared for a vertical splice, the cable sheaths being removed from over the wires to be spliced.

Figure 7 is a view of the cables shown in Figure 6 with the sleeve in initial position and the spacer disk or separator plate in place.

Figure 8 is a view similar to Figure 7 but showing the appearance after the individual wires have been spliced and the group of individual splices wrapped.

Figure 9 is a view, partly in section, of the completed vertical splice.

Figure 10 is a face view of a separator plate constructed in accordance with this invention and showing the mold and cores in position.

Figure 11 is a section on the line 11—11 of Figure 10.

Figure 12 is a perspective view of one of the cores.

Figure 13 is a section similar to Figure 11 but showing the completed separator plate.

Figure 14 is a diametric section through one end of a completed vertical joint and showing the separator plate, the view being considerably enlarged.

Figure 15 is a top plan view of a completed splice showing a plurality of cables spliced to a single cable.

In Figures 1 to 9 inclusive there is shown the improved manner of splicing a paper insulated cable 10 to a pair of cables 11 and 12 of unequal size, horizontal splicing being shown in Figs. 1 to 5 and vertical splicing being shown in Figs. 6 to 9. These cables are all of the lead sheathed type and a kerf 13 is formed around each cable in spaced relation to the extremity of the portion to be spliced. Rings 14 are sawed off the sheath of each cable 11 and 12 and these rings are laid aside for purposes to be explained. Each cable has the sheath from the kerf 13 to its extremity split and removed in the usual manner. The bundles of insulated wires 15 are now exposed as in Figures 2 and 6 and the remaining end portions 16 of the lead sheaths are now scraped and coated with a flux. A suitable sleeve 17 now has a section 18 sawed from one end and laid aside with the rings 14 for the purpose hereinafter described, and this sleeve is slipped on the cable 10 and has the end remote from the cables 11 and 12 scraped, covered with stearine and beaten in as shown at 19.

Now referring to Figures 10 to 14 the ring 18 is placed on a suitable plate, sheet or board 20 having a plane surface on which the ring is rested. The inside of the ring is coated with plumber's soil or similar material. One layer of friction tape or the equivalent 21 of the same width as the rings 14 is now wrapped around each of said rings and then four layers 22 of the same kind of tape about three-fourths the width of the rings is wrapped around each ring and the layer 21 thereof, the finished ring being shown in Figures 11 and 12. These rings are now placed in desired positions on the piece 20 inside the ring 18, Figure 11 showing two such rings while Figure 10 shows four such rings in position preparatory to molding the disc. The rings may all be about one inch wide or of substantially the same width. The mold, formed in this manner, now has lead or solder poured into it until it is substantially half full, to form the spacer plate 23. The rings 14 and 18 are now removed and a kerf 24 is sawed around the plate 23 after which a strip of muslin or similar packing material 25 is wrapped around the periphery of the plate and secured by a cable conductor 26, or other wire, in the kerf 24. An insulating disc 27 made of cardboard or similar material is then tacked on that face of the plate 23 which was uppermost in the molding and the separator plate is ready for use, being provided with countersunk openings 28 for the cables 11 and 12. Obviously as many cables as desired may be used, the sections or rings sawn off the ends forming cores when wrapped to provide cable openings.

Because of the ring 18 being lined with plumber's soil the resultant separator plate casting will be slightly less in diameter than the sleeve. Also, because of the tape wrapping 21 the resultant cable openings will each be slightly larger than the cables which are to pass therethrough. The insulating disk has openings therein corresponding in size and position to the larger ends of the openings 28.

Turning again to Figures 1 to 9 and also referring to Figure 14 it will be seen that two separator plates 23 are required for a horizontal splice while but one is used for a vertical splice. In making the horizontal splice the cables 11 and 12 are led through the openings 28 in two plates 23 arranged with their cardboard sides confronting. In this case the plate remote from the cable ends will have the kerf 24, muslin 25 and wire 26 omitted, being left with a smooth edge. Calking 29 of a cotton tape or similar packing material is then calked into the larger ends of the openings 28 in each plate and the inner plate set in the position it is to occupy permanently. The sleeve 17 has its open end scraped and coated with a flux internally.

The individual conductors of the cables 11 and 12 are now spliced to the conductors of the cable 10 and a wrapping 30 of treated muslin or similar insulating material is applied to the bundle of properly insulated conductor splices. The sleeve 17 is slipped over this wrapping and the portion around the inner plate 23 is beaten in the manner shown at 31 in Figure 14. The wiped joint 32 (see Fig. 4) is now made and the outer separator plate is driven into position substantially flush with the end of the sleeve 17, the latter being beaten in against the plate. An opening 33 is cut in the top of the sleeve and melted solder is run through a small funnel placed in this opening to completely fill the space between the plates to form the seal 34. As previously stated, the inner wall of the sleeve 17 was scraped and coated with a flux, as were also the end portions 16 of the lead sheaths and hence the melted solder poured through the opening 33 into the cavity between the plates 23, coheres with the lead sheaths and the inner wall of the sleeve 17 to become integral therewith and thus form a perfect seal.

The procedure in making a vertical joint is substantially the same except that but one separator plate 23 is used and this plate is arranged like the inner plate of the horizontal joint so that solder 35 may be poured into the open upper end of the sleeve 17 to fill this end as shown in Figures 9 and 14.

It will be seen that my method of forming splices provides a means of connecting a number of cables to a single cable as indicated in Figure 15. It is also possible to connect a number of cables to two or more cables. In this case both ends of the splice would be closed by means of separator plates and melted solder in the manner described.

I claim:

1. The steps in the method of forming a cable joint between a plurality of lead sheathed cables and a single cable which consists in slipping a lead sleeve over the single cable at one end of the splice, forming a pair of separator plates each having a diameter slightly less than the internal diameter of the sleeve and each having correspondingly positioned openings to receive the respective cables at the other end of the splice, exposing clean metal surfaces on the ends of the sheaths and the inner wall of the adjacent end of the sleeve and covering said exposed surfaces with a flux, leading said cables through said openings, splicing the conductors of the cables at one end of the splice to the conductors of the cable at the other end, moving the sleeve and plates into position so that the sleeve covers the conductor splices and the plates lie in spaced relation within an end of the sleeve, and filling the space between said plates with molten material to cohere with said clean surfaces of the lead sheaths and inner surface of the sleeve and make a sealed joint therebetween.

2. In a lead sheathed cable joint, cables entering a splice at one end having conductors spliced to the conductors of the cable or cables entering the splice at the opposite end, a sleeve surrounding said conductor splices and extending around the cables adjacent said conductor splices, a separator plate within and spaced from the end of the sleeve and having openings through which said cables pass, and solder material fluxed into integral union with the inner wall of the sleeve and the peripheral surfaces of the cable sheaths and completely filling the space between the separator plate and the end of the sheath.

3. In a lead sheathed cable joint, cables entering a splice at one end having conductors spliced to the conductors of cable or cables entering the splice at the opposite end, a sleeve surrounding said conductor splices and extending around the cables adjacent said splices, a pair of separator plates within one end of the sleeve and spaced apart and having openings through which the said cables pass, and solder material fluxed into integral union with the inner wall of the sleeve and the peripheral surfaces of the cable sheaths and completely filling the space between said plates.

ADOLPH Z. MAMPLE.